United States Patent [19]

Takagi et al.

[11] Patent Number: 5,270,802
[45] Date of Patent: Dec. 14, 1993

[54] WHITE BALANCE ADJUSTING DEVICE FOR VIDEO CAMERA

[75] Inventors: Yasushi Takagi; Takuya Imaide, both of Kanagawa, Japan

[73] Assignee: Hitachi, Ltd., Tokyo, Japan

[21] Appl. No.: 921,990

[22] Filed: Aug. 3, 1992

Related U.S. Application Data

[63] Continuation of Ser. No. 507,527, Apr. 11, 1990, abandoned.

[30] Foreign Application Priority Data

Apr. 14, 1989 [JP] Japan .................................. 1-92833
Apr. 28, 1989 [JP] Japan .................................. 1-107604

[51] Int. Cl.⁵ .............................................. H04N 9/73
[52] U.S. Cl. ...................................... 358/29; 358/41
[58] Field of Search ................... 358/29 C, 29, 41

[56] References Cited

U.S. PATENT DOCUMENTS

| | | | |
|---|---|---|---|
| 4,727,413 | 2/1988 | Miura et al. ........................ | 358/290 |
| 4,797,733 | 1/1989 | Takagi et al. ..................... | 358/29 C |
| 4,918,519 | 4/1990 | Suzuki et al. ..................... | 358/29 C |
| 4,959,727 | 9/1990 | Imaide et al. ..................... | 358/228 |

FOREIGN PATENT DOCUMENTS 62-142496 7/1987 Japan .
62-175090 7/1987 Japan .

Primary Examiner—Mark R. Powell
Attorney, Agent, or Firm—Antonelli, Terry, Stout & Kraus

[57] ABSTRACT

A white balance adjusting device for video camera performs white balance control at high speed for an image which does not include a white colored portion under artificial illumination outside blackbody radiation while maintaining stability for usual illumination condition. An iris detector for detecting an iris value of an iris mechanism a, fluorescent light detector for determining whether or not an illumination source is a fluorescent lamp and correction apparatus responsive to an output of the fluorescent light detector to correct said white balance control signal suitably are provided. In order to obtain a high speed response to a variation of illumination, an integration circuit for averaging color-difference signals, amplifier circuits responsive to the averaged color-difference signals to control gains of chrominance signals to thereby produce white balance control signal for regulating white balance, a hold apparatus for holding white balance control signal temporarily and a converter apparatus for converting the content of the hold apparatus into signal for driving the chrominance signal gain control circuit, and a change apparatus for changing a timing of rewriting the content of the hold apparatus are further provided.

18 Claims, 7 Drawing Sheets

WHITE BALANCE ADJUSTING DEVICE FOR VIDEO CAMERA

This application is a continuation of application Ser. No. 507,527 filed Apr. 11, 1990 now abandoned.

BACKGROUND OF THE INVENTION

The present invention relates to a white balance adjusting device for a video camera and to an improvement of response characteristics thereof to variation of relative moving speed of an object in a view angle of the video camera.

In a conventional device such as shown in Japanese patent application laid-open No. 219291/1988 or U.S. Pat. No. 4,797,733, video signal from a portion in a video image, which can be considered as having white color or having no color, is extracted and gains of red (R) and blue (B) components of the video signal are controlled such that a ratio between R and B gains of an averaged signal of this portion becomes 1 while following a locus of color temperature variation of blackbody radiation. In such conventional device, control signal for adjusting white balance is generated on a basis of comparison of the average signal value of the white portion with a reference signal value corresponding to $R-B(=0)$ in color temperature.

This is effective to automatically adjust white balance in a case where there is a white color or no color portion. In a case where there is no such portion within the image, white balance is fixed in a reference regulation state. The reference regulation is set in a range 4000°–5000° K in view of a variation range of color temperature under practical illumination. In such case where there is no white portion in the image and an automatic adjustment can not be performed, error may be increased dependent on lighting condition.

As to a response characteristics of white balance adjustment to color temperature variation of illumination with time, Japanese patent application laid-open No. 109686/1988 discloses a technique in which it is fixedly determined by a time constant of a color-difference signal integrating, low-pass filter of a white balance adjusting circuit and a pulse period of counter driving pulse.

In this case, a compatibility of high response to abrupt change of illumination and stability against colored portion incoming to the image is hardly obtained. That is, when adjusting speed is increased to improve only response characteristics, sensitivity to panning and/or moving object becomes too high, causing stability to be degraded. On the other hand, when adjusting speed is reduced to improve stability, smoothness response to a change of lighting condition of an object from high illumination to low illumination can not be obtained.

An object of the present invention is to reduce error generation in white balance adjustment even in a case where there is no white portion in an image.

Another object of the present invention is to provide a device which can extract only white portion reliably to allow an accurate white balance adjustment.

Another object of the present invention is to provide a white balance adjusting device which can perform a white balance adjustment even with artificial illumination such as fluorescent light which does not correspond to blackbody radiation.

Another object of the present invention is to provide an automatic white balance adjusting circuit which can provide compatibility of stability in usual lighting condition and high response to illumination change by selectively using low speed response and high speed response.

SUMMARY OF THE INVENTION

According to the present invention, white balance adjusting range and adjusting scheme are changed by using informations such as luminance information obtainable from an iris value of a video camera, illuminance information obtainable from light source and color temperature information obtainable from external color sensor or from chrominance signals. For illumination which does not have a trace color temperature locus corresponding to that of blackbody radiation, an adjustment is performed correspondingly to deviation from the color temperature locus. Further, for a case where reliable extraction of white color portion can not be expected, white balance adjustment is temporarily stopped if necessary. That is, in such case, white balance adjusting signal is temporarily stored in a memory such as digital counter capable of periodically changing its content and operation speed of the memory, i.e., content change period, is made variable by a signal produced by such as a variable frequency oscillator. Alternatively the variable change period can be obtained by frequency-dividing a basic period to produce a plurality of different periods and by selecting one of them and the selected one frequency is supplied to the memory. This period selection is automatically switched to another period after a predetermined time lapsed. Further, according to the present invention, means is provided for making integration time constant of color-difference signal averaged over a time to make white balance adjusting signal generation variable or a plurality of integration means having different time constants are provided.

In a video camera having automatic exposure function, illumination can be known substantially by detecting an iris value. Further, from the illumination value, an estimation of illumination condition during photographing can be made to some extent. For example, in outdoor under fine weather, illumination value may be in the order of 10000 1× or more, in shadow under cloudy condition, in the order of several hundreds to 1000 1× and, indoor, less than the latter value. It is further possible to distinguish between incandescent light and fluorescent light on the basis of flicker of the latter. Therefore, white balance is roughly obtained by shifting an original reference adjusting point according to the iris information and then a fine adjustment is performed in the conventional manner. That is, according to the estimation of illumination, color temperature range of an object can be defined and, since the reference adjusting points for respective illuminations are set in positions near to each other, there is no substantial deviation of white balance adjustment even if the object has no white portion. It is possible to roughly adjust white balance, i.e., to shift reference point, according to not such iris information but an output of a color sensor capable of detecting a ratio of red component to blue component of ambient light or chrominance signals R and B before white balance adjustment. In a case where a portion of an image of the object, which can be considered as white, is reduced during photographing, adjusting data (voltage etc) obtained when there is white portion of sufficient size is stored and adjustment is stopped during an area of the white portion in the image is reduced below a predetermined threshold value (say 20%) so that adjustment is frozen in a state immediately before the area is reduced down to the threshold value or the stored data. Therefore, it is possible to prevent color tone from abruptly changing due to disappearance of white portion during photographing. Further, by ganging a zooming operation with the temporary stoppage of white balance adjustment, color tone change due to variation of photographing view angle can be avoided.

In order to obtain the compatibility of response to abrupt change of lighting condition and stability under usual lighting condition, the digital counter temporarily storing white balance control signal is operated by an externally supplied timing pulse and stored data is changed sequentially according to period of the pulse. According to a variation of photographing condition (ambient illumination, operation of a camera, etc.), pulse having a shorter period is supplied to the counter for a predetermined time period after an occurrence of the variation. By this, a quick response is obtained to variation of illumination including turning-on of a power of a light source so that white balance corresponding to a new condition is obtained. In a normal condition after the predetermined time period, pulse having longer period is supplied to the counter to obtain a stable white balance which is not sensitive to movement of the object or slight variation of illumination. Change of response speed can be also achieved by changing integration period of color-difference signal inputted to the white balance signal generation system, such that integration time constant is small when photographing condition is changing and large in a normal condition. Therefore, white balance which is stable in the normal condition and highly responsive to variation of condition is obtained.

BRIEF DESCRIPTION OF THE DRAWINGS

FIG. 2b is a graph showing an operational characteristics of the correction circuit in FIG. 2a;

DETAILED DESCRIPTION OF THE PREFERRED EMBODIMENTS

An embodiment of the present invention will be described with reference to FIG. 1.

Figure 1:
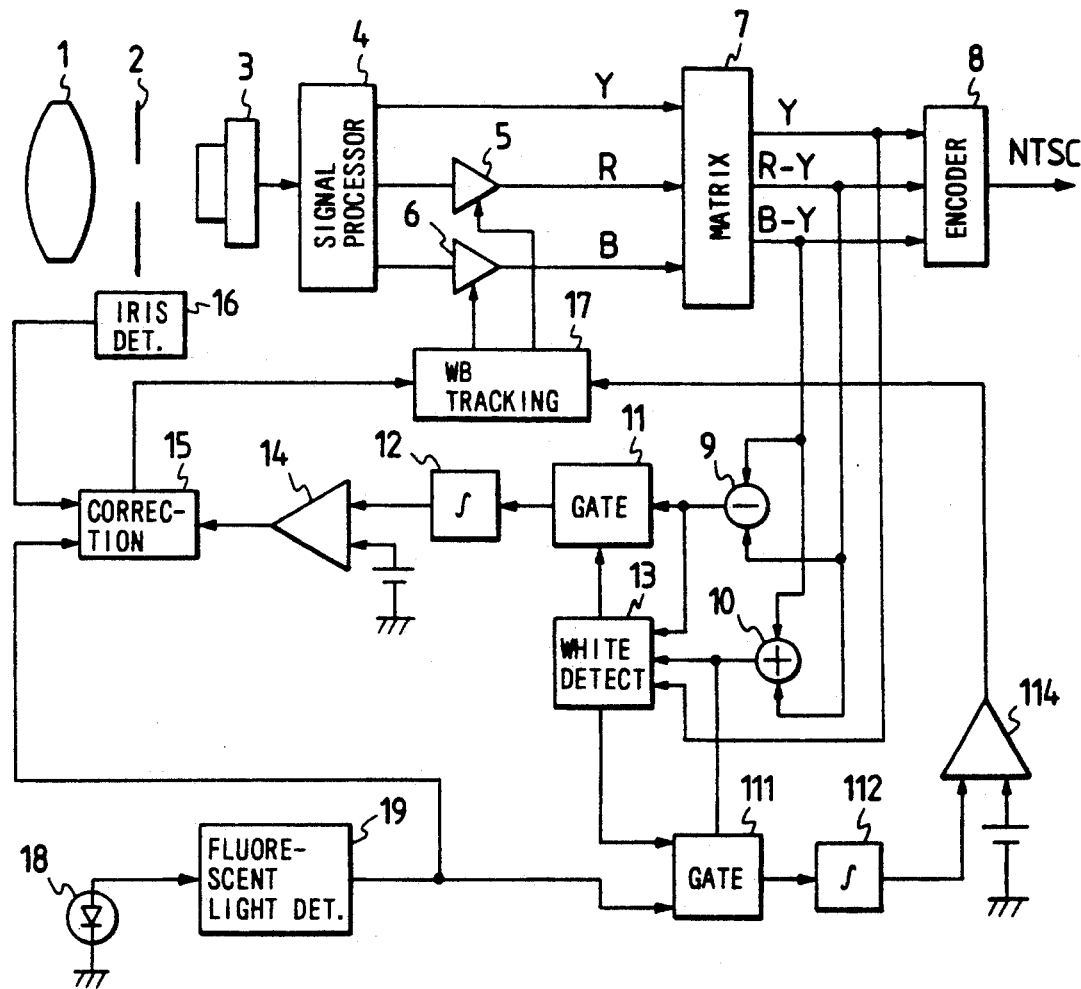
FIG. 1 is a block diagram showing an embodiment of the present invention.

In FIG. 1, an amount of light passed through a lens 1 of a video camera is regulated by an iris 2 and focused on an image element 3. A signal processing system 4 produces luminance signal Y and chrominance signals R and B from a output signal of the image element 3. Chrominance signal R and chrominance signal B are regulated in gain by gain control circuits 5 and 6, respectively, and then combined in a matrix circuit 7 with luminance signal Y to produce color-difference signals $R-Y$ and $B-Y$. Thereafter, the luminance signal and chrominance signals are branched into two systems, one being passed through an encoder 8 to produce a TV signal and the other being supplied to a white balance (WB) control system. In the WB control system, a white color portion in an image is detected by using luminance and color-difference signals to produce a signal for white balance adjustment, which is fedback to the gain control circuits 5 and 6.

Figure 3:
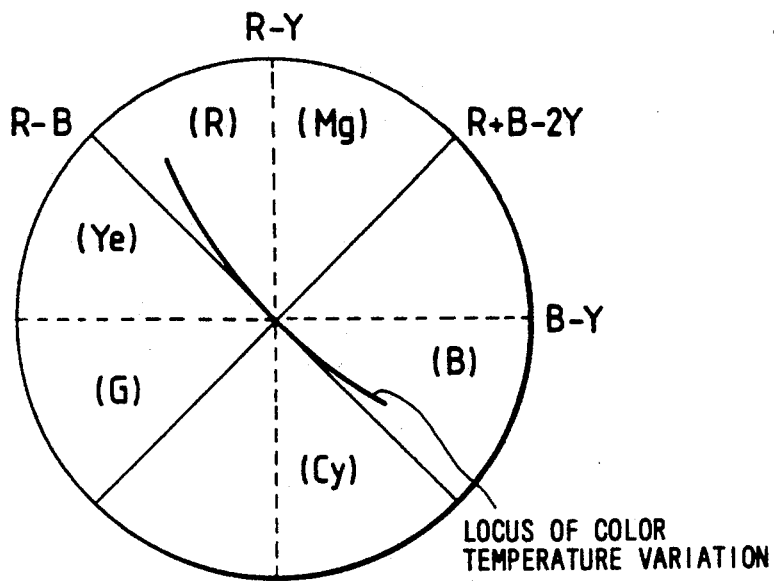
FIG. 3 is a plane view of color-difference for explanation of the operational principle.

An operation of the control system will be described in detail. Color-difference signals $R-Y$ and $B-Y$ are added and subtracted with a predetermined ratio, say 1:1, to obtain $R-B$ signal and $R+B-2Y$ signal. Locus of color temperature variation (color tone variation of natural light) according to blackbody radiation is shown by a thick solid line on the color-difference plane in FIG. 3. That is, a deviation from white (cross point of $R-Y$ and $B-Y$ axes) due to color temperature variation of light source can be known on $R-B$ axis and deviation from the cross point due to other reason than color temperature variation can be known on $R+B-2Y$ axis. From these two signals and the luminance signal, effectiveness of an image portion for white balance adjustment is decided and a control signal is produced from the image portion decided as effective in a white detection circuit 13. The luminance signal is used to remove color signal of a dark portion, whose amplitude is small and can not be reflected on $R+B-2Y$ signal and $R-B$ signal. The signal produced in the white detection circuit 13 drives gate circuits 11 and 111 provided in the $R-B$ signal system and the $R+B-2Y$ signal system, respectively, so that only signals obtained from white portions of the respective signals are supplied to integration circuits 12 and 112. The respective signals averaged over a whole image (or several images) in the integration circuits 12 and 112 are compared in comparator/amplifiers 14 and 114 with reference voltages corresponding to the WB reference points, respectively, to produce a WB control signal.

The control signal in $R-B$ direction obtained from the amplifier 14 and the control signal in $R+B-2Y$ direction obtained from the amplifier 114 are converted, in a WB tracking 17, into signals for controlling gains of chrominance signals R and B. For example, the WB tracking 17 may be not required when the $R-B$ signal and $R+B-2Y$ signal are used to detect white color portion and the WB control signal is produced from the $R-Y$ and $B-Y$ signals.

Figure 4:
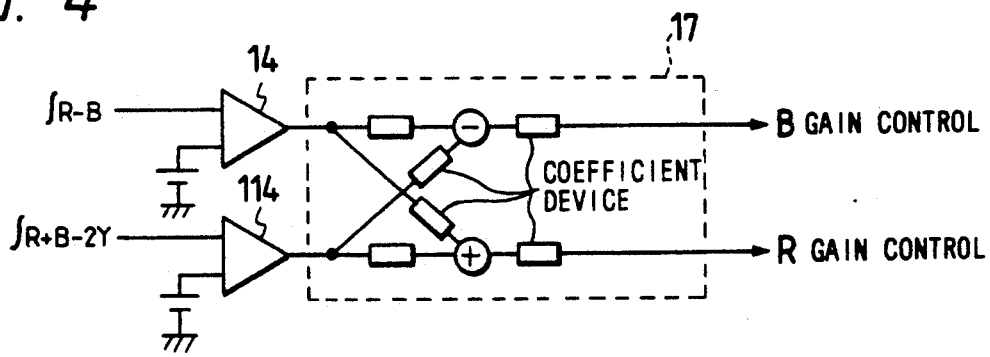
FIGS. 4 and 5 show concrete construction of main blocks shown in FIG. 1.

The WB tracking 17 may be constituted with an adder, a subtractor and a coefficient device (if needed), etc., as shown in FIG. 4. In this embodiment, a fluorescent light detection circuit 19 for determining from an output of a photodiode 18 mounted on a camera body whether or not illumination is from a fluorescent lamp and an iris detection circuit 16 for detecting a condition of the iris 2 are provided. Only when it is decided by the fluorescent light detection circuit 19 that illumination is from a fluorescent lamp, the gate 111 in the $R+B-2Y$ signal system becomes opened and a control in $R+B-2Y$ direction (G$\longleftrightarrow$Mg direction) is performed. On the contrary, when it is decided that the illumination is not from a fluorescent lamp, the gate 111 is turned-off to stop the control in the G←→Mg direction. That is, since solar light and incandescent light, etc., follow the aforementioned color temperature variation locus, WB can be obtained by performing only the R−B direction control. With such limitation in control direction, undesired adjustment error due to an object having light green color is avoided.

A correction circuit 15 provided between the comparator/amplifier 14 and the WB tracking 17 responds to the signals from the fluorescent light detection circuit 19 and the iris detection circuit 16 to determine lighting condition (indoor, outdoor, fluorescent light, incandescent light, etc.) and, according to the latter, perform a correction of the WB control signal. When the iris 2 is closed beyond a predetermined value (say F4), it is decided that illumination is sufficiently high, i.e., fine, outdoor lighting condition. Since in such condition, it is generally considered that color temperature is high (5000° K or more), the WB reference point is shifted toward high color temperature side to reduce control for low color temperature side. On the contrary, when the iris 2 is opened beyond the predetermined value, it is decided that illumination is low, i.e., indoor lighting condition. Since, when lighting is not from a fluorescent lamp, illumination source may be incandescent lamp whose color temperature is low (3000° K or lower), the WB reference point is shifted toward the low color temperature side to restrict the control on high color temperature side.

Figure 2A:
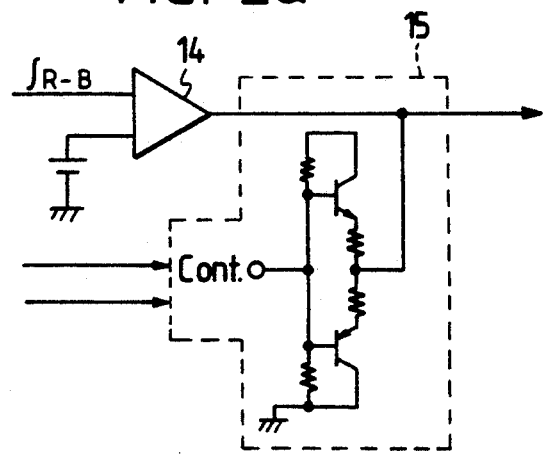
FIG. 2a is a circuit diagram of a correction circuit shown in FIG. 1.
Figure 2B:
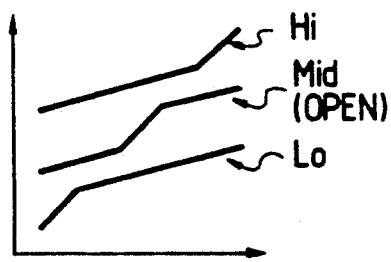

The correction circuit 15 may be constituted as shown in a dotted line in FIG. 2a, in which, when an input terminal CONT is Hi, a control characteristics for mainly high color temperature side is obtained and, when it is Lo, that for mainly low color temperature side is obtained as shown in FIG. 2b.

According to this embodiment in which the WB control is performed according to lighting condition, erroneous operation is eliminated even for an object whose white portion which is effective for the WB adjustment is small.

Figure 5:
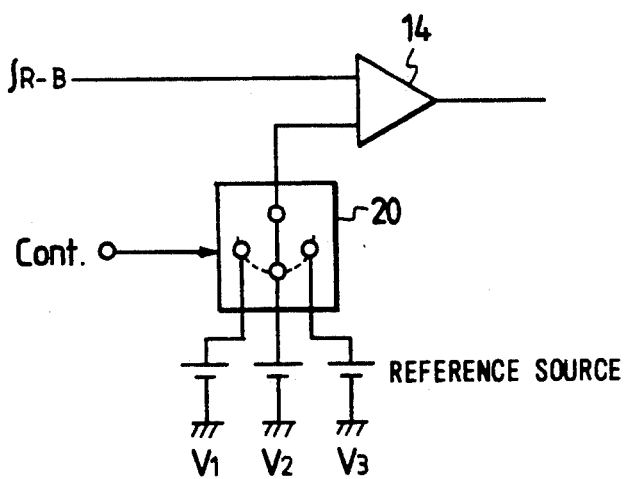

A second embodiment of the present invention will be described with reference to FIG. 5. In this embodiment, instead of the correction circuit 15 provided at the output of the comparator/amplifier 14 of the first embodiment shown in FIG. 1, the shifting of the WB reference point is performed by changing a comparison reference voltage of the comparator/amplifier 14. To one input of the comparator/amplifier 14, one of three reference voltages, V1 for low color temperature, V3 for high color temperature and V2 for other color temperature, is selectively supplied through a selector means 20 such as multiplexer. The effect of this construction is the same as that obtained by the first embodiment.

Figure 6:
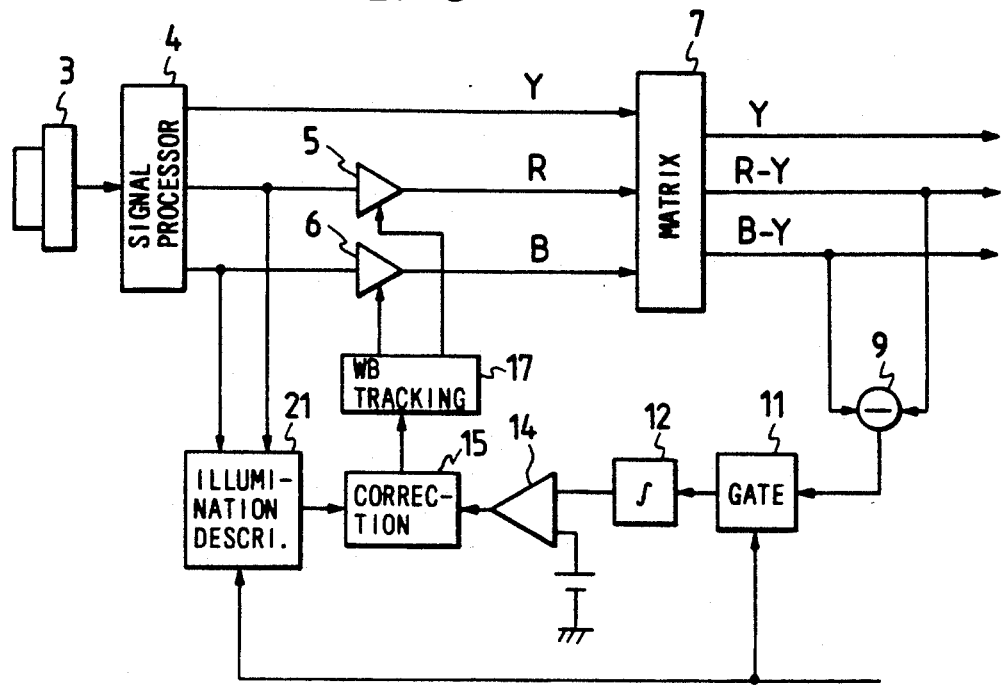
FIGS. 6 to 9 show block diagrams of other embodiments of the present invention.

A third embodiment will be described with respect to FIG. 6. The construction of this embodiment is similar to that of the first embodiment and therefore the R+B−2Y axis control system and the white portion detection system are omitted for clarification. The feature of this embodiment is to obtain an information for controlling the WB control signal correction circuit 15 directly from the chrominance signals R and B, that is, before inputted to the R and B gain control circuits 5 and 6.

An illumination discrimination means 21 produces a signal for controlling the WB control signal correction circuit 15, which corresponding to an output of the iris detection circuit 16, from the chrominance signals R and B and the white portion deriving signal. The correction circuit 15 responds to the output signal of the illumination discrimination means 21 to correct the WB control signal as in the first embodiment. Although not shown, it is possible to use a fluorescent light signal used in the first embodiment together.

Further, instead of the correction circuit 15, it is possible to use a selection means for comparison reference voltage as in the second embodiment.

Figure 7:
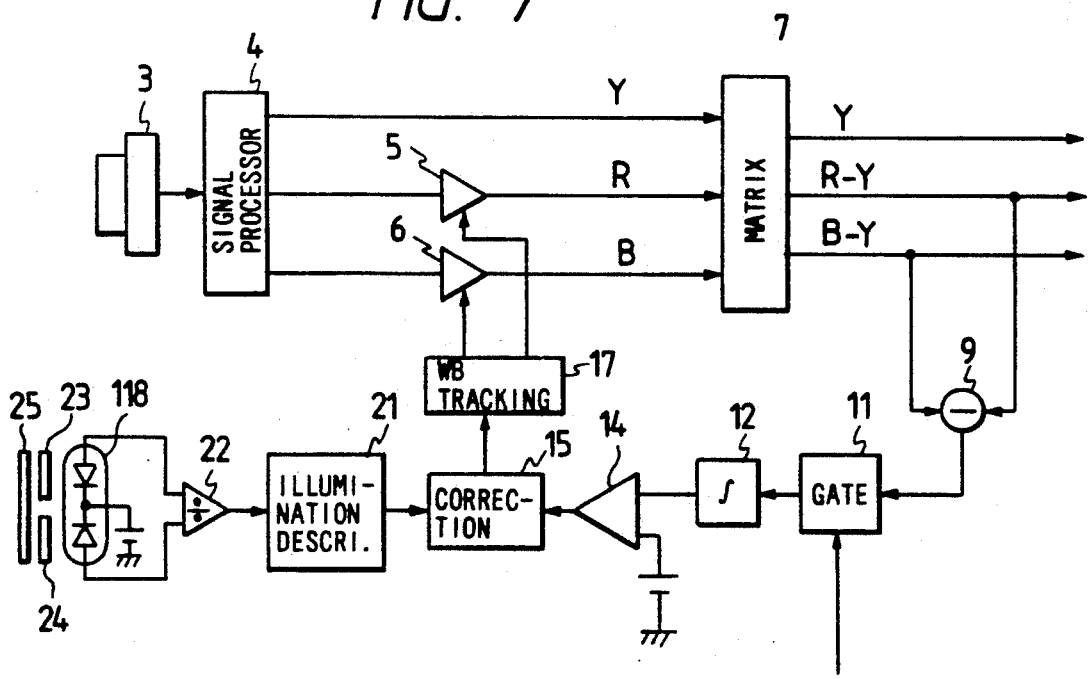

A fourth embodiment of the present invention will be described with reference to FIG. 7. In FIG. 7, the R+B−2Y axis control system and the white portion detection system are omitted too for clarification. The whole construction thereof is similar to those in the first and third embodiments and operations of the correction circuit, etc., other than mentioned below are the same as those in the first and third embodiments.

In this embodiment, the R/B ratio of ambient light is detected by an external light color measuring system consisting of a light diffusion plate 25, a red transparent filter 23, a blue transparent filter 24, a pair of photodiodes 118 and a divider circuit 22 connected to the photodiodes, all of which are mounted on the body of video camera. The illumination discrimination means 21 responds to the R/B ratio to produce a control signal for the correction circuit 15.

In this embodiment, the same effect is obtainable as the correction circuit 15 in the first embodiment by switching between the comparison reference voltages supplied to the comparator/amplifier 14. In this fourth embodiment, it is possible to use the photodiodes 118 for detecting both the illumination detection and fluorescent light detection.

In the third and fourth embodiments, in addition to the same effect as that obtained by the first embodiment is obtainable, a finer illumination discrimination is possible, for example, between cloudy outdoor condition and highly bright indoor condition.

Figure 8:
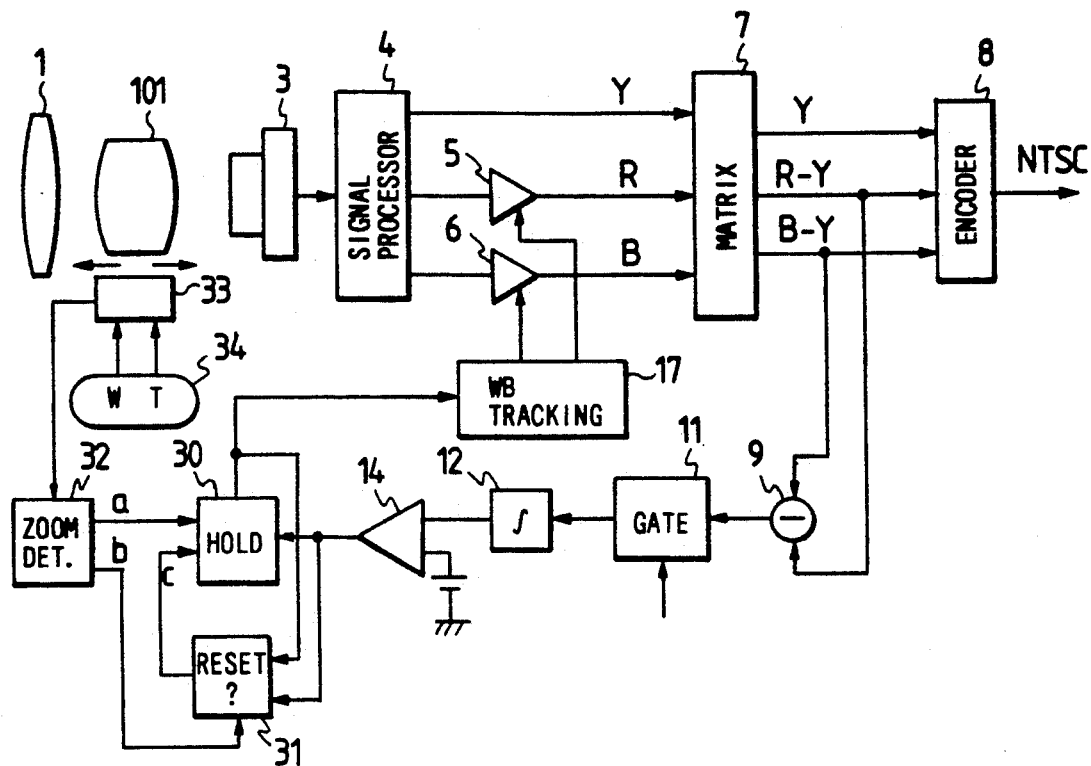

A fifth embodiment of the present invention will be described with reference to FIG. 8. This embodiment includes a WB control signal hold means 30 instead of the WB control signal correction circuit 15 in the first, second and third embodiments. An operation thereof will be described. A zoom detection means 32 for detecting that a motorized zoom switch 34 is operated to move a zoom lens 101 during photographing or a zoom lens moving mechanism 33 is manually operated produces a detection signal (pulse) at an output a thereof at a start of operation and at an output b at an end of the operation. The hold circuit 30 responds to the zoom start signal at the terminal a to hold an output value of the amplifier 14 at the same time until a reset signal is supplied to a terminal c thereof and supplies it to a WB tracking. Therefore, the WB adjustment is stopped for the time for which the hold means 30 is operating, so that color tone variation during zooming is eliminated. When the zooming is stopped, the zooming end signal is outputted from the terminal b of the zoom detection means 32. A reset discrimination circuit 31 compares, in synchronism with the zoom end signal, an output of the hold means 30 with an output value of the comparison/amplifier 14 at this moment.

When a difference therebetween is small (for example, the difference being 10 to 30% with respect to the WB control dynamic range), that is, when it is considered that there is no substantial variation in color tone even if the holding is removed, the reset signal is supplied to the terminal c of the hold means 30. The hold means 30 responds to the reset signal to remove the holding and allows the output of the amplifier 14 to pass to the WB tracking as the WB control voltage.

According to this embodiment, the unstable variation of color tone due to zooming is prevented and, particularly, an erroneous operation during a time from a long-shot to an up-shot is prevented. The zoom detection may be combined with not only optical zoom means but also electronic zoom means.

A sixth embodiment of the present invention will be described with reference to FIG. 9. The whole construction of this embodiment is similar to that of the first embodiment and therefore details of individual components are omitted.

Figure 9:
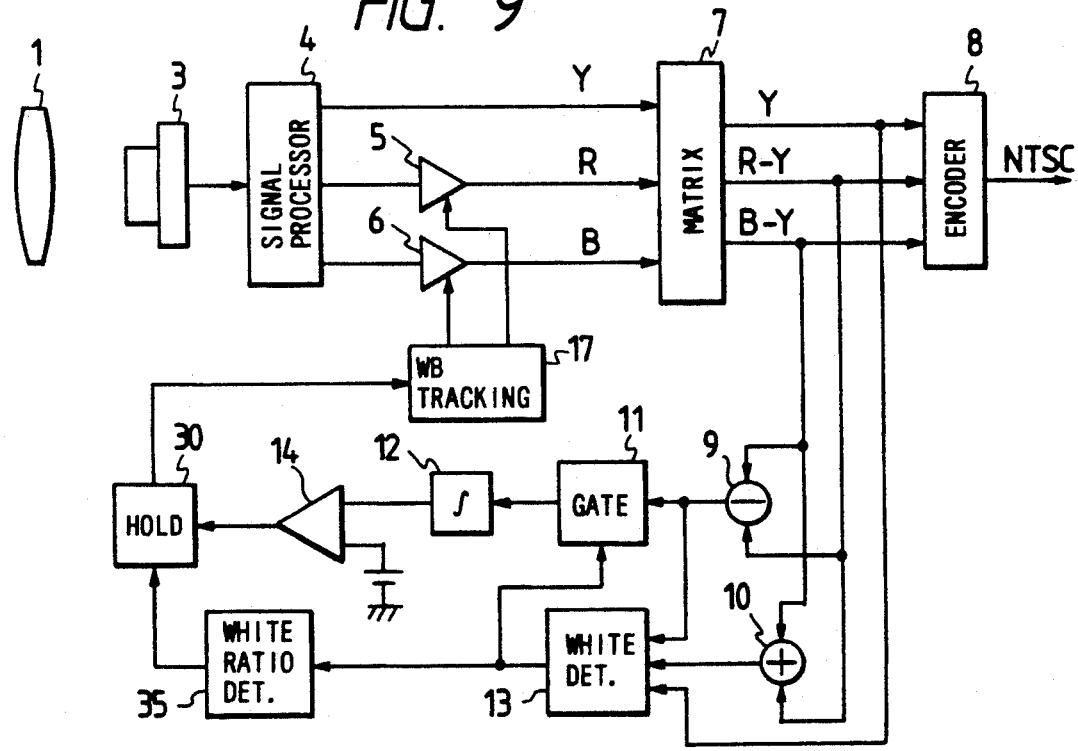

In FIG. 9, a white portion detection circuit 13 operates according to the same principle as that in the first embodiment to output a white portion extracting signal in synchronism with a white portion of an image. The white portion extracting signal is supplied to a gate 11 provided in a R−B signal system and a R+B−2Y signal system (not shown). In this embodiment, a white ratio detection circuit 35 is provided for detecting from the white portion extracting signal a ratio of white portion in the image. This circuit controls the hold means 30 such that the latter holds an output value of the comparator/amplifier circuit 14 when the ratio of white portion in the image becomes smaller than a predetermined amount (for example 10 to 20%) and unusable for proper WB adjustment. The hold circuit 30 supplies the held control signal to the next WB tracking 17 during a time when the white portion ratio is below the predetermined amount and stops holding and returns to a usual WB control when the white ratio detection circuit 35 determines that white portion ratio exceeds the predetermined amount.

In stopping the holding and returning to the usual control, the WB control signal may be reset to an intermediate value temporarily. In this and fifth embodiments in which the hold means is provided at an output stage of the comparison/amplifier 14, it may be provided in the input side of the amplifier circuit (output side of the integrator 12) or in an output side of the WB tracking 17.

According to this embodiment, the unstability of the WB control due to a reduction of white portion during panning in which the WB control is apt to be affected by other colored portion and an erroneous operation thereby are prevented.

Figure 10:
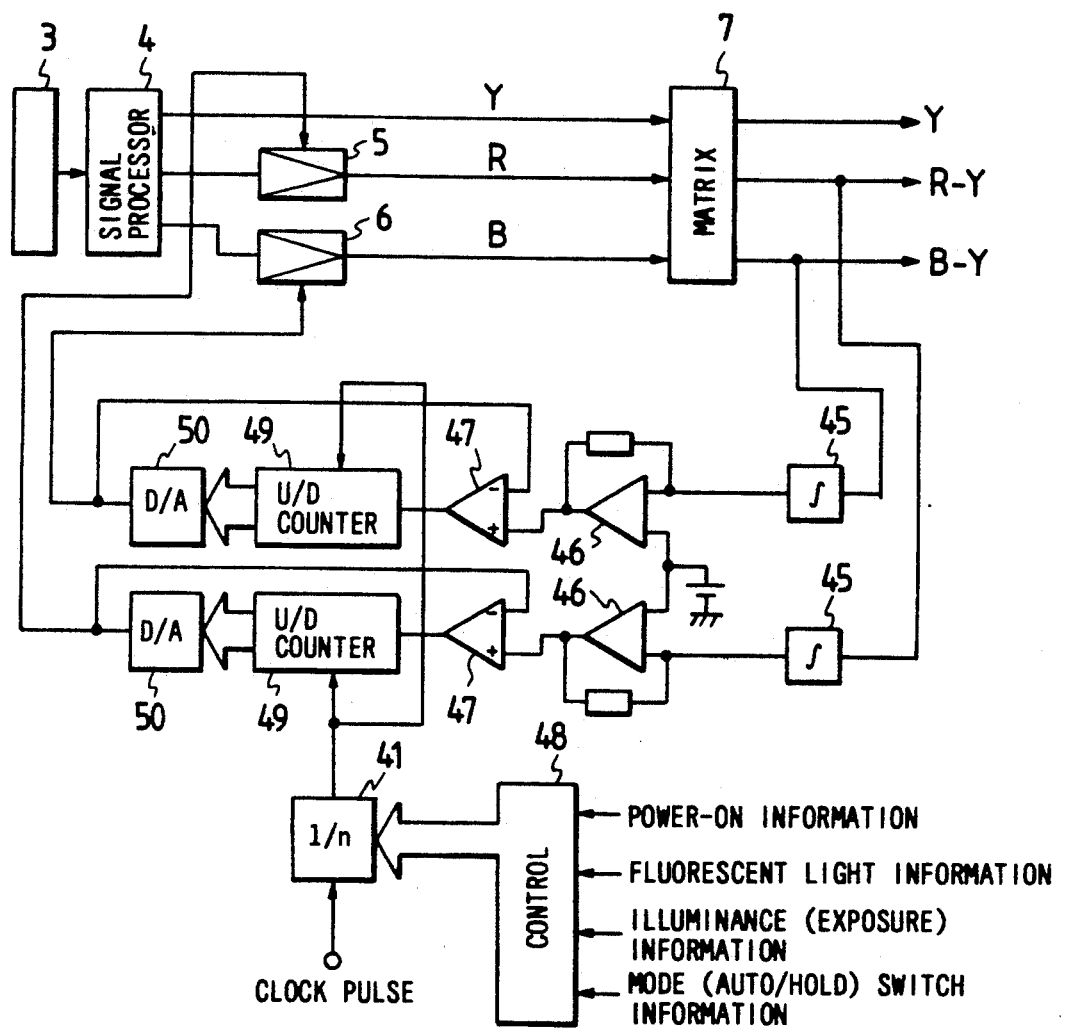
FIG. 10 is a block circuit diagram of another embodiment of the present invention.

FIG. 10 shows another embodiment of the present invention. In FIG. 10, color-difference signals R−Y and B−Y are integrated in integrators 45 and then compared in comparator/amplifiers 46 with a reference voltage corresponding to R−Y(B−Y)=0, a resultant white balance control signal is fedback to gain control circuits 5 and 6 and white balance adjustment is performed such that R−Y=0, B−Y=0 are obtained at the output of the matrix circuit 7.

In this embodiment, a white balance signal memory means composed of comparators 47, up/down counters 49 and D/A converters 50 are provided between the comparator/amplifiers 46 and the chrominance signal gain control circuits 5 and 6.

The construction of this portion may be modified such that outputs of the integrators 45 are compared with the reference voltage and resultant differences are supplied to the up/down counters 49 without using the comparatort/amplifiers 46. In such case, there is no need of feeding back the outputs of the D/A converters 50 to the comparator circuits 47, respectively.

The up/down counters 49 respond to the outputs, Hi or Lo, of the comparator/amplifiers connected thereto to up-count or down-count counter data every input of drive clock pulse and the contents thereof are balanced when positive or negative inputs of the comparators 47, that is, outputs of the D/A converters 50 coincide with the output of the white balance signal generating amplifier circuit. In a stable condition after such balance, voltages applied to the chrominance signal gain control circuits 5 and 6 substantially coincide to the outputs of the amplifiers 47. However, the counter data are not changed so long as there is no input of drive clock pulse, even if the output of the amplifiers are changed temporarily. That is, by changing the period of the drive clock pulse, it is possible to change an actual white balance control response to a variation of white balance control signal. Therefore, the period of pulse supplied to the counters is made variable suitably by providing means (frequency divider 41 etc) for changing pulse period of drive pulse inputted to the counters in the pulse system and control means 18 for controlling the changing means according to informations from respective detection means such as that for detecting on-off of the power source.

According to this embodiment by which control response to variation of photographing condition is realized, a color tone variation due to an error in white balance adjustment is prevented and a adjusting time up to the balanced condition can be shortened.

Figure 11:
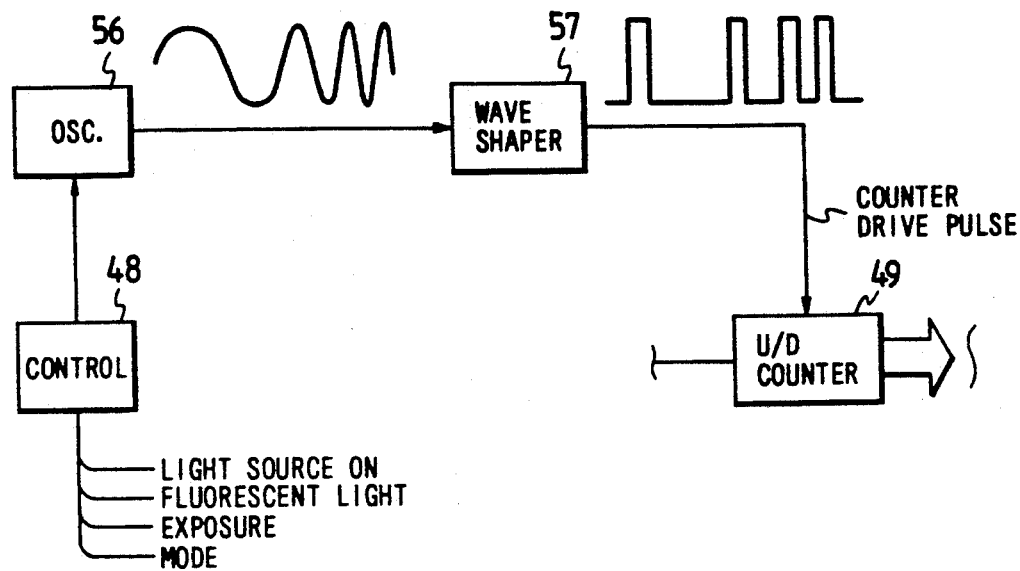
FIG. 11 is a block circuit diagram showing a counter control circuit used instead of a combination of a frequency divider and a control means shown in FIG. 10.

An example of the pulse period changing means of the present invention is shown in FIG. 11. In FIG. 11, drive pulses for the up/down counters 49 are generated by means of a variable frequency oscillator 56 and waveform shaper 57, instead of the frequency divider 41 of the preceding embodiment. Oscillation frequency of the oscillator 56 is controlled externally by a control 58. The control means 58 receives variations of illumination condition informations such as light source power-on, fluorescent light, exposure and operation mode of a video camera, etc., and controls oscillation frequency of the oscillator 56.

In this case, pulse period of the drive pulse can be changed continuously easily, so that finer speed control is possible.

Figure 12:
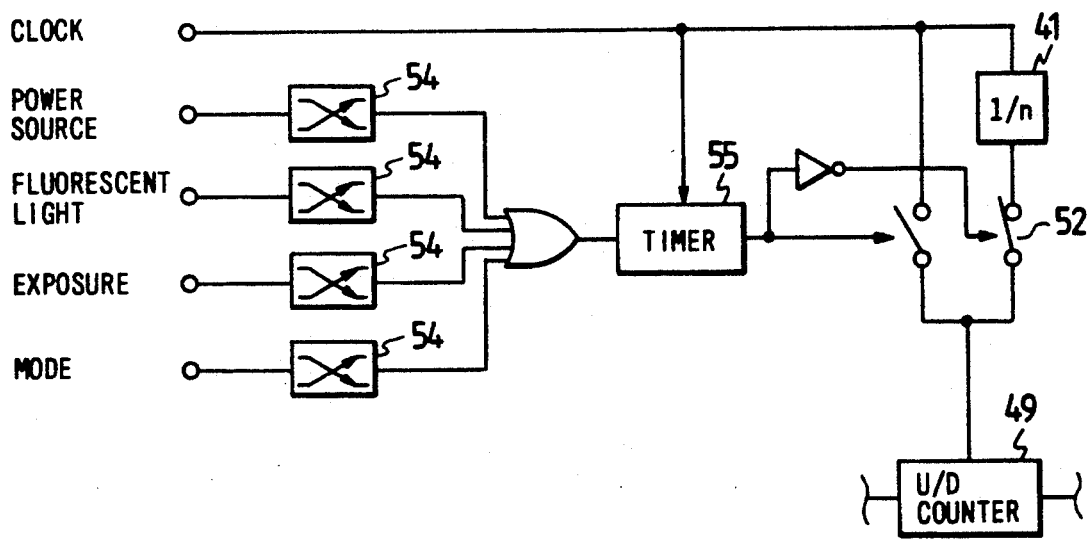
FIG. 12 is a block diagram showing another embodiment of the present invention.

FIG. 12 shows a detail of the example shown in FIG. 11. The control means 58 comprises a plurality of leading/trailing edge detectors 54 corresponding in number to the informations, an OR gate having inputs connected to outputs of the leading/trailing edge detectors, a timer 55, an inverter and a double throw switch 52. Each leading/trailing edge detector 54 detects a leading edge and/or trailing edge of a pulse produced by a change of one of the informations and produces a trigger pulse at its output by which, when at least any of such photographing condition is changed, the timer 55 is triggered such that high frequency pulse is supplied to the up/down counters 49 for a predetermined time after such change occurs and, after such time lapsed, pulse frequency is reduced automatically. That is, the timer 55 controls the switch 52 such that high frequency pulse is supplied to the up/down counter 49 for a predetermined time after such trigger input is supplied, that is, such variation of condition occurs, and thereafter low frequency pulse provided by the frequency divider 41 is supplied thereto.

The predetermined time may be a time period in which the up/down counter 49 down-counts from full to null at the longest and, if means is provided for resetting the counter to an intermediate value in synchronism with the leading and trailing edge detection, the period may be a half of the period mentioned above. The measuring operation of the timer 55 is performed by actually measuring time calculated from the bit number of the counter 49 and a basic drive pulse period or by counting the basic pulses (or pulses having the same period) to be supplied to the counter 49.

According to this embodiment, in the white balance control device having a function capable of changing response speed, high speed operation is performed only when photographing condition changes and after white balance is achieved and it becomes stable under the new condition, low speed operation is started. Therefore, both high response and stability are realized compatibly.

Figure 13:
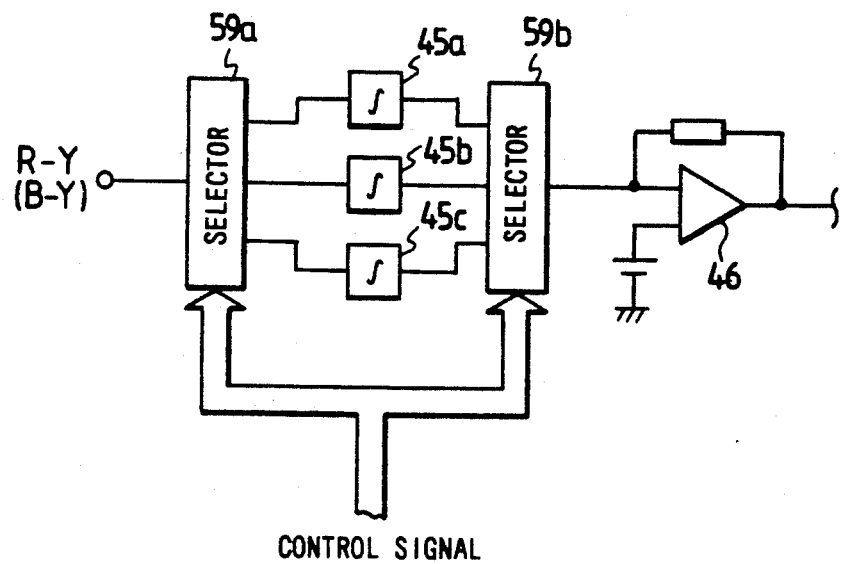
FIGS. 13 and 14 show block diagrams showing other embodiments of the present invention, respectively.
Figure 14:
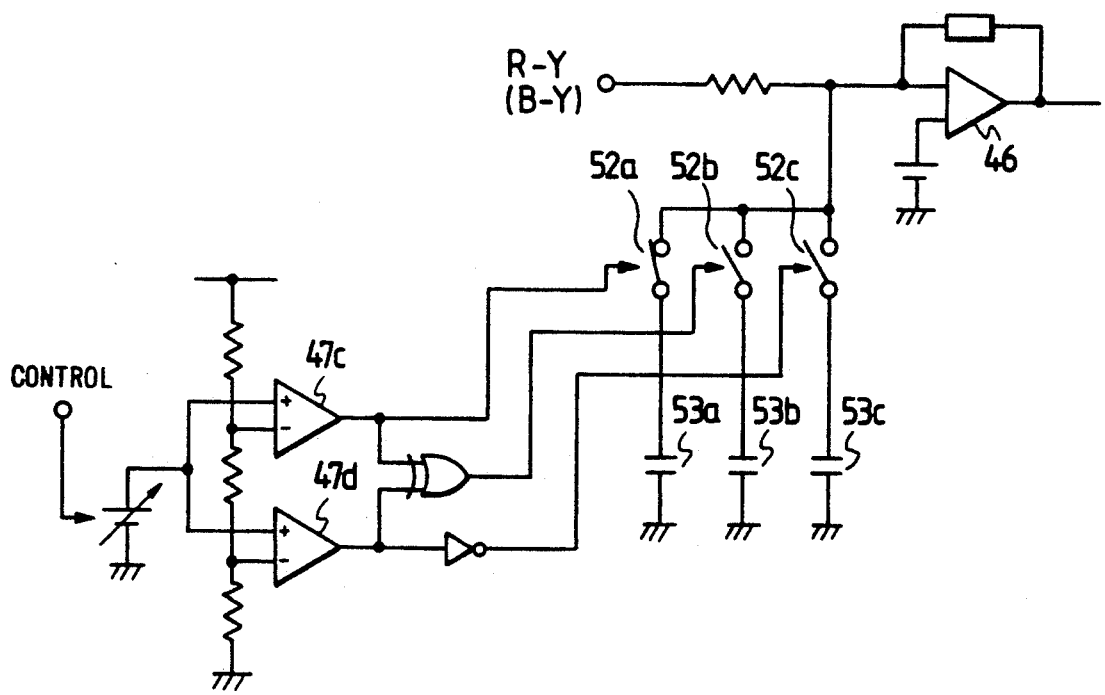

FIGS. 13 and 14 show examples of the integrator 45, respectively. In FIGS. 13 and 14, a time constant of the integrator 45 for averaging the color-difference signal inputted to the amplifier 46 for white balance control signal generation is changed. The example shown in FIG. 13, three integration circuits 45a, 45b and 45c having different integration time constants are provided one of which is selected by selection circuits 59a and 59b controlled by a suitable control signal from control means (not shown) constructed in such a way that it determines a control speed according to various detection informations as in the preceding embodiment. That is, at least one of the integration circuits 45a, 45b and 45c is selected such that, when high speed response is required, one having small time constant is selected. As another means for changing integration time constant, means for changing only capacitance related to time constant determination may be used as shown in FIG. 14 or resistance related thereto may be changed. In FIG. 14, switch circuits 52a, 52b and 52c are provided and selection of any of the switches 52a, 52b and 52c is controlled by voltage value. For example, when a ladder resistance value in FIG. 14 is selected such that when in order to divide a voltage range from 0 to 5 V (GND to power source voltage) into three regions, 1.5 V is applied to a minus input of the comparator circuit 47d and 3.5 V to a minus input of 47c, outputs of these comparators become Lo when control voltage supplied to plus inputs of these comparator circuits are below 1.5 V and only switch 52a becomes ON so that a capacitor 53a is connected. Similarly, 52b is turned ON with 1.5 to 3.5 V and 52c becomes ON above 3.5 V, to connect capacitors 53b and 53c, respectively.

According to this example, the same effect is as that in the preceding embodiment is obtained. Further, the circuit construction can be made simpler due to unnecessity of up/down counters and D/A converters, etc., for speed control.

As described hereinbefore, according to the present invention in which the control method (one dimensional, two dimensional) and control characteristics (high color temperature significant, etc) are selected according to illumination and kind of light source etc, erroneous white balance is prevented and WB accuracy is improved. Further, since it is possible to restrict unnecessary response to variations of photographing such as zooming or panning, prevention of erroneous operation and stabilization of tone (WB) are realized.

Further, high speed adjustment of white balance is possible against variation of photographing condition, and response to abrupt change of photographing condition is improved. In this connection, a low speed control is possible in a stable condition and undesired operation due to variation of color temperature detection condition caused by change of view angle and/or moving object is prevented. As a result, a smooth and reliable white balance control is realized.

What is claimed is:

1. A white balance adjusting device comprising a white balance circuit composed of color signal gain control circuits, integration circuits for producing a white balance control signal, comparator/amplifiers, a tracking correction means responsive to said control signal to drive said gain control circuits, white color detection means for extracting a signal corresponding to a white portion in an image, gate circuits, iris detection means for detecting an iris value of an iris mechanism for determining whether light illuminating an object to be imaged is at a value substantially representing artificial illumination light or natural outdoor light, fluorescent light detection means for determining whether or not an illumination source is a fluorescent lamp, and correction means responsive to an output of said fluorescent light detection means and said iris detection means to correct said white balance control signal in accordance therewith.

2. The device claimed in claim 1, wherein said correction means comprises means for shifting a reference voltage or limiting a range of variation of the reference voltage with respect to said control signal.

3. The device claimed in claim 2, wherein said voltage shift is performed toward high color temperature side when said outputs of said iris detection means and said fluorescent lamp detection means indicate an outdoor condition, toward low color temperature side when said outputs of said iris detection means and said. fluorescent lamp detection means indicate an indoor condition with incandescent lamp and to an intermediate color temperature when said outputs of said iris detection means and said fluorescent lamp detection means indicate an indoor condition with fluorescent lamp.

4. The device claimed in claim 2, wherein said limitation of variation range is performed by limiting an amount of variation of said white balance control signal, changing a tracking range of white balance adjustment with respect to color temperature variation or by incorporating white balance adjustment for color tone variation of a light source other than color temperature variation when fluorescent light is detected or by stopping the adjustment when other light source than fluorescent lamp is used or narrowing the adjustment range.

5. The device claimed in claim 1, further comprising selection means responsive to said outputs of said iris detection means and said fluorescent lamp detection means to select one of a plurality of reference voltage sources and apply said selected reference voltage to said comparator/amplifier circuit.

6. The device claimed in claim 1, further comprising color temperature detection means for detecting color temperature of a light source on the basis of red and blue color signals obtained from said white color portion and wherein said control signal correction means is controlled by an output of said color temperature detection means.

7. The device claimed in claim 1, further comprising color measuring means for measuring color of external light, said color measuring means comprising a light diffusion plate, a red color filter, a blue color filter, photodiodes and a divider, and wherein said color temperature detection means detects color temperature of light source from an output of said color measuring means and said correction means corrects said control signal in response to an output of said color temperature detection means.

8. The device claimed in claim 1, further comprising means for detecting a zoom operation, means for holding said white balance control signal and means for determining whether or not said holding operation of said holding means is to be continued.

9. The device claimed in claim 8, wherein said hold means holds an input signal of said comparator/amplifier circuit.

10. The device claimed in claim 8, further comprising means responsive to an output of said white color detection means for detecting white color ratio in said image, and wherein said hold means holds said control signal for a time when said ratio is below a predetermined value.

11. The device claimed in any of claims 1 to 10, wherein luminance of an object is used as a color temperature detection information.

12. The device claimed in any of claims 1 to 10, wherein a signal from a low luminance portion of said object is ignored.

13. A white balance adjusting device according to claim 1, wherein said correction means is responsive to said iris detection means for correcting said white balance control signal in accordance with the determination whether the light illuminating the object to be imaged substantially represents artificial illumination light or substantially represents natural outdoor light.

14. A white balance adjusting device according to claim 1, wherein said iris detection means provides an output indicating that the light illuminating the object to be imaged substantially represents artificial illumination light when the iris value of the iris mechanism is one of above and below a predetermined iris value and provides an output indicating that the light illuminating the object to be imaged substantially represents natural outdoor light when the iris value of the iris mechanism is the other of one of above and below the predetermined value.

15. A white balance adjusting device comprising a white balance adjusting circuit composed of color signal gain control circuit means, integration circuit means for producing a white balance control signal, comparator/amplifier means, tracking correction means responsive to the white balance control signal for driving the gain control circuit means, white color detection means for extracting a signal corresponding to a white portion in an image, gate means, means for providing information including iris detection means for detecting an iris value of an iris mechanism for information of whether light illuminating an object to be imaged is at a value substantially representing artificial illumination light or natural outdoor light, and correction means responsive to an output of the information providing means for correcting the white balance control signal in accordance therewith.

16. The device claimed in claim 15, wherein the means for providing information further include the providing of information of at least one of fluorescent light, a zoom value of a zoom mechanism, color temperature and white ratio.

17. A white balance adjusting device according to claim 15, wherein said correction means is responsive to said iris detection means for correcting said white balance control signal in accordance with the determination whether the light illuminating the object to be imaged substantially represents artificial illumination light or substantially represents natural outdoor light.

18. A white balance adjusting device according to claim 15, wherein said iris detection means provided an output indicating that the light illuminating the object to be imaged substantially represents artificial illumination light when the iris value of the iris mechanism is one of above and below a predetermined iris value and provides an output that the light illuminating the object to be imaged substantially represents natural outdoor light when the iris value of the iris mechanism is the other of one of above and below the predetermined value.

* * * * *